Nov. 3, 1942.  A. F. LANDEFELD  2,301,128
BAG
Filed July 9, 1940
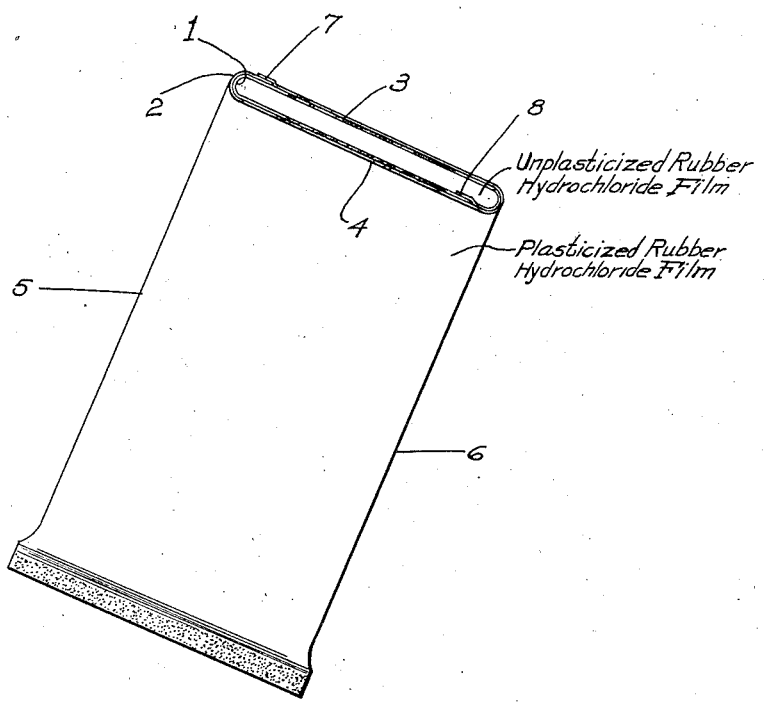
Inventor
Alexander F. Landefeld
By
Attorney Patented Nov. 3, 1942

2,301,128

UNITED STATES PATENT OFFICE 2,301,128

BAG

Alexander F. Landefeld, Cuyahoga Falls, Ohio, assignor to Wingfoot Corporation, Wilmington, Del., a corporation of Delaware Application July 9, 1940, Serial No. 344,537

2 Claims. (Cl. 150—1)

This invention relates to a new rubber hydrochloride bag.

There are two general types of rubber hydrochloride film on the market. One type is the unplasticized film, and the other type is the plasticized film. The usual plasticizers are butyl stearate and dibutyl phthalate. These may be used alone or in admixture. A small amount of wax may be added.

It is recognized that the unplasticized film does not have the strength and durability of the plasticized film. The plasticized film is therefore preferred in many cases, but in certain instances, as in the packaging of foodstuffs, the plasticizer is at times found to be objectionable because the plasticizer brings about contamination of the food. This is particularly noticeable in delicately flavored foodstuffs and foodstuffs which readily absorb odors.

In order to combine in bags the advantages of the plasticized and unplasticized films, two types of bags have been designed. One type of bag is the duplex or double-wall bag. This comprises a bag of unplasticized film on the inside and a separate bag of plasticized film on the outside. The two bags are generally united only at the bottom. The plasticized film of which the outside bag is made gives the product the durability and strength characteristic of the plasticized film. The unplasticized bag on the inside prevents contamination of the contents by the plasticized film. There have been certain objections to a bag of this type. One objection, for instance, is that the two separate layers of film reduce the visibility of the contents of the bag.

To overcome this objection, there has been developed a bag made of laminated film, the inner ply of which is unplasticized film and the outer ply of which is plasticized film. Such a bag has the high visibility of a single wall bag. There have been objections to this type of bag, particularly because of the development of leaks at the creases. Apparently the film cracks or is weakened by folding this laminated sheet. Such creases are present in a bag of the envelope type and a bag with plicated sides and, in fact, any type of bag.

According to the present invention a bag is formed of two plies of rubber hydrochloride film. The inner ply is of unplasticized film, and the outer ply is plasticized. This gives the strength of the plasticized film on the outside, and the freedom from contamination due to the presence of the unplasticized film on the inside. To give the increase in visibility which has previously been obtained by uniting the two plies of film, the two sheets of film comprising each wall of the bag are united, but at the folds the two plies are not united. By not laminating at the folds, the danger of leaks developing at the creases is reduced or eliminated.

One type of bag having this structure is shown in the accompanying drawing. The inner ply 1 is unplasticized film, and the outer ply 2 is of plasticized film. The two plies are united throughout the center portion of the center walls as indicated by the heat-seals 3 and 4. They are not united at the side creases 5 and 6. The long side seams 7 and 8 are formed by heat-sealing. The bag may be formed by inserting a long tube of unplasticized film inside a long tube of the plasticized film, uniting opposite walls with heat and pressure to form the sides of the bags and cutting them to length. The bottoms of the bags may be formed by heat-sealing one end of each of the lengths together, or folding and sealing, as desired.

Instead of a heat-seal, the two plies may be united by a solvent, or by a cement or in any suitable manner.

I claim:

1. A bag formed of plasticized rubber hydrochloride film and unplasticized rubber hydrochloride film coalesced together at the bottom in a flat seam, all seams of the bag being formed by coalescence of the film material, the plasticized film being outside the unplasticized film and the two films being coalesced together over most of the area of each side of the bag to increase the visibility of the contents, but being free from one another at the two edges of the bag where the film is creased.

2. A bag formed of two films of heat-sealable, transparent film united at the bottom in a flat seam, all seams of the bag being formed by coalescence of the film, each of the two films being coalesced to the other on both sides of the bag to increase the visibility of the contents but being free from one another at the two edges of the bag where the films are folded.

ALEXANDER F. LANDEFELD.